(No Model.)

J. W. EVENDEN.
ALE CONDENSER.

No. 278,525.  Patented May 29, 1883.

Witnesses.
Louis F. Gardner
J. W. Garner

Inventor.
Jas. W. Evenden,
per
F. A. Lehmann,
Atty

UNITED STATES PATENT OFFICE.

JAMES W. EVENDEN, OF ROME, NEW YORK.

ALE-CONDENSER.

SPECIFICATION forming part of Letters Patent No. 278,525, dated May 29, 1883.

Application filed January 12, 1883. (No model.)

*To all whom it may concern:*

Be it known that I, JAMES W. EVENDEN, of Rome, in the county of Oneida and State of New York, have invented certain new and useful Improvements in Ale-Condensers; and I do hereby declare the following to be a full, clear, and exact description of the invention, such as will enable others skilled in the art to which it pertains to make and use it, reference being had to the accompanying drawings, which form part of this specification.

My invention relates to an improvement in ale-condensers; and it consists, first, in the combination of a faucet, which is driven into the barrel containing the ale, a connecting-pipe applied thereto, a three-way cock, and a condensing-chamber, whereby the ale may be drawn directly from the barrel into the condenser and dispensed through the same cock; second, in a partition which is cut away at its lower edge and placed in the condenser, so that when the ale rushes into the condenser the froth and foam will be carried back beyond the partition, and thus be prevented from running out into the glass, all of which will be more fully described hereinafter.

The object of my invention is to produce an apparatus into which the ale can first be forced by the pressure of the gas in the barrel, and thus allow the froth and foam to become condensed before it is drawn off into the glass, whereby a glass of clear ale can be drawn instead of having only half ale and half froth or foam, as is the case where the ale is drawn directly from the barrel.

Figure 1:
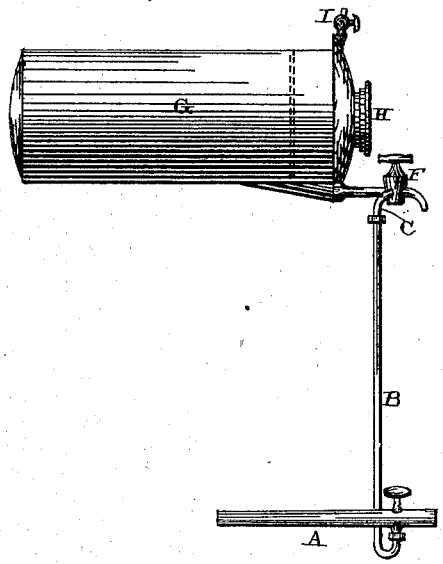
Figure 2:
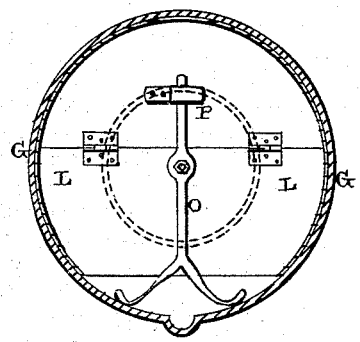
Figure 3:
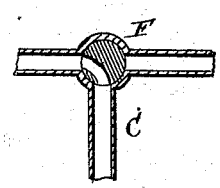

Figure 1 is a side elevation of an apparatus embodying my invention. Fig. 2 is a vertical cross-section of the same, taken through the condenser. Fig. 3 is a detailed sectional view of the three-way cock and its connections.

A represents an ordinary faucet, which is driven into the barrel containing the ale, and which has a suitable connecting-pipe, B, connected with its plug. The upper end of this connecting-pipe is joined to an arm or branch, C, leading into one side of the three-way cock F. This cock is connected to the condensing chamber G, which is provided at its outer end with a suitable man-hole, H, and a small cock, I, through which the gas can be allowed to escape. This condensing-chamber is intended to be placed through the side of an ice-box or refrigerator, so as to keep the ale which is forced by the pressure of the gas in the barrel up through the connecting-pipe. By the use of the three-way cock the ale can be allowed to flow freely into the condenser, and then drawn directly off into a glass as it may be needed.

Placed in the condensing-chamber is a partition, L, which is cut away at its lower edge, so as to leave a space between the lower edge of the partition and the bottom of the chamber. When the cock is turned so that the ale flows from the barrel into the condenser it enters the condenser with considerable force, and causes a great deal of froth and foam. This froth and foam will be carried by the force of the incoming current back under the partition, where it will rise upon the top of the ale in the condenser. When the cock is open to draw the ale into a glass this froth and foam is kept floating upon the top of the ale in the back part of the condenser, and hence does not run into the glass. This partition may either be placed in the condenser before the condenser is closed up or it may be in several pieces, which are hinged together, as here shown. Pivoted upon the lower end of these pieces is the lever O, which can be made to catch behind the holder P at its upper end, and thus prevent the two parts from assuming such an angle in the condenser that it will cease to operate. Where the condenser has been completed these parts will be hinged together, so that they can be folded up and inserted through the man-hole and placed in position. The lower end of the lever O may be provided with or formed into springs, to hold the partition firmly at whatever point it may be placed in the condenser. It is not necessary that the partition be perfectly tight above its lower edge, for it may be either perforated or of solid material. This partition also serves to prevent the froth from rising up in front of the glass that is inserted in the man-hole cap, and from blowing out at the gas-cock. The ale may be carried back, as here shown, by a pipe that runs back of the partition, or in any other way.

Having thus described my invention, I claim—

1. The combination of the faucet, which is to be driven into the barrel of ale, the connecting-pipe, the three-way cock, and the condenser, substantially as shown.

2. The combination of the condenser with the partition cut away at its lower edge, substantially as shown and described.

In testimony whereof I affix my signature in presence of two witnesses.

JAMES W. EVENDEN.

Witnesses:
 F. E. MITCHELL,
 J. M. REIFERT.